United States Patent Office 3,620,132
Patented Nov. 16, 1971

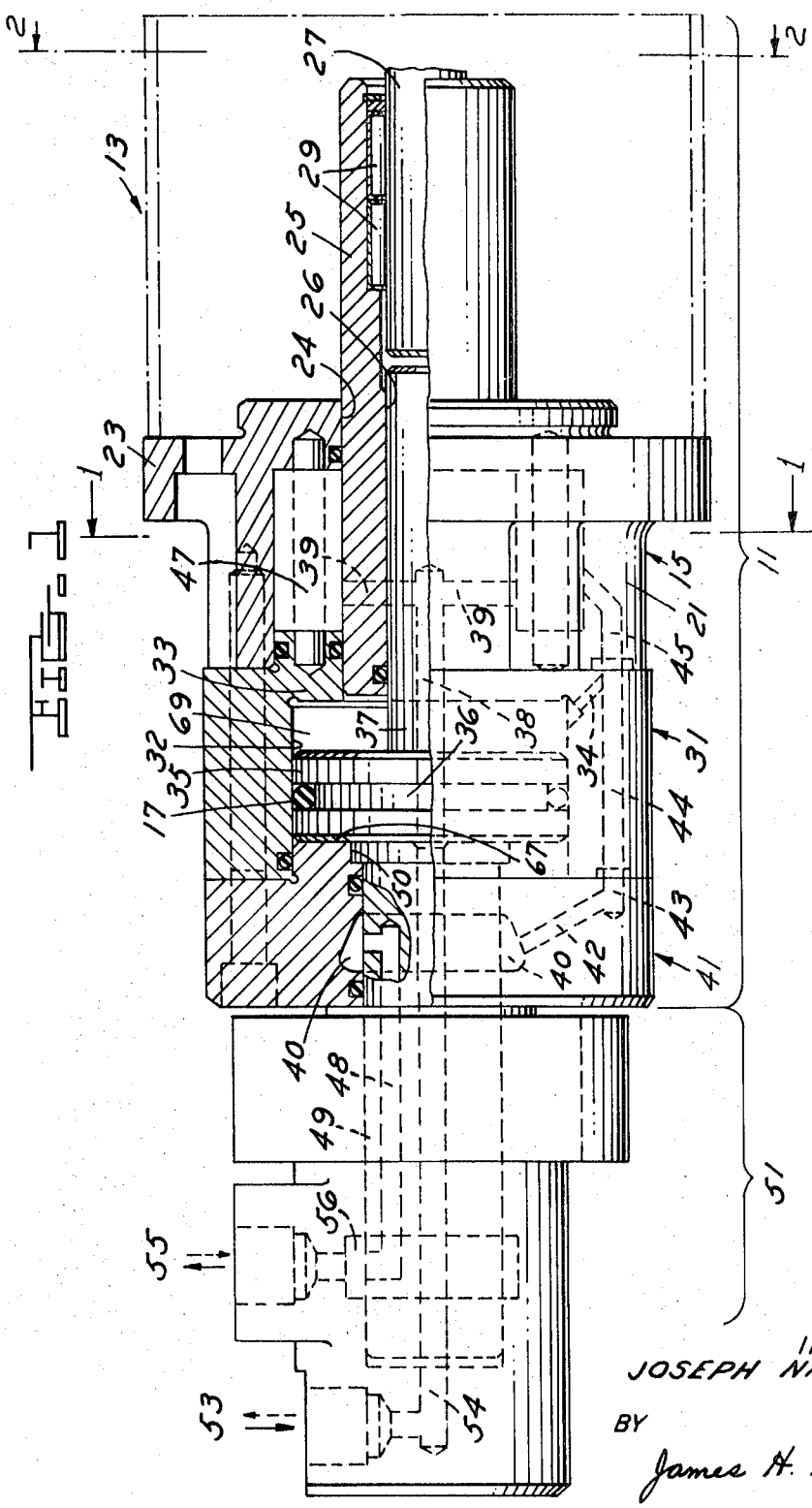

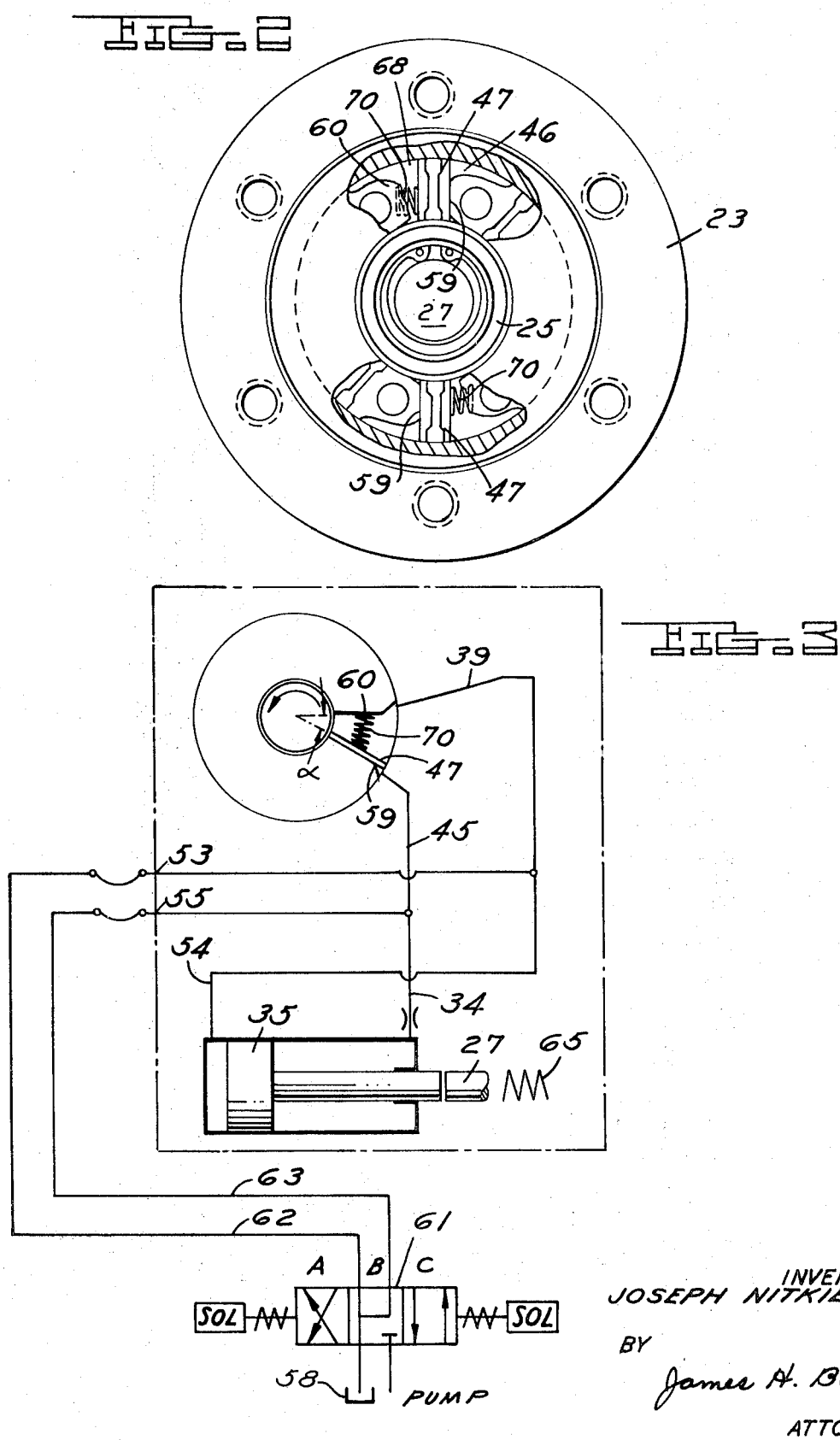

3,620,132
ROTARY-LINEAR ACTUATOR
Joseph Nitkiewicz, Farmington, Mich., assignor to
Ex-Cell-O Corporation, Detroit, Mich.
Filed Sept. 25, 1969, Ser. No. 861,109
Int. Cl. F01b 21/00
U.S. Cl. 92—2                                    1 Claim

ABSTRACT OF THE DISCLOSURE

A rotary-linear actuator to permit retraction and size compensation of a cutting tool.

BACKGROUND OF THE INVENTION

(1) Field of the invention

This invention relates to a fluid control device of the type shown in Drake Pat. No. 3,215,046, issued Nov. 2, 1965 and Ludwig et al. Pat. No. 2,793,623, issued May 28, 1957. Devices of this type have a plurality of circumferentially disposed vanes mounted on a shaft which is rotated by hydraulic fluid to selectively rotate the shaft. This invention is particularly concerned with rotary and linear movement of the shaft.

(2) Description of the prior art

It is known to selectively hold and release a shaft by means of devices utilizing a releasing means. These releasing means may comprise electromagnetic clutches, pressure rollers, or vane type such as disclosed in the above noted, cited patents.

SUMMARY OF THE INVENTION

According to the present invention, a rotary actuator and piston are mounted to a rotating spindle and connected to a hydraulic pressure source through a rotary coupling. The piston actuation causes the draw bar to move in a linear direction thereby causing the connected tapered cam to retract the cutting tool, as shown in Griswold et al. Pat. No. 3,391,585, issued July 9, 1968, on a Boring Spindle. The rotary motion of the actuator causes a rotary index of the cam which action changes tool size in a manner disclosed in Griswold et al. Pat. No. 3,391,585. A single direction clutch permits rotary return while maintaining the cam in its newly set position.

BRIEF DESCRIPTION OF THE DRAWINGS

FIG. 1 is partial cross-sectional view of the rotary actuator sectional view of the rotary actuator assembly, and taken along a line 1—1 of FIG. 2.

FIG. 2 is partial cross-sectional view of the rotary vane means, and taken along a line 2—2 of FIG. 1.

FIG. 3 is a schematic diagram showing one of the arrangements for supplying the fluid, air or hydraulic, to the actuators.

DESCRIPTION OF THE PREFERRED EMBODIMENT

The cutting tool of a precision boring spindle requires a means for retracting the tool after the boring operation has been finished, in order to avoid tool marks during the return stroke of the spindle. It is also desirable to provide a means for a controlled radial expansion of the cutting tool in order to compensate for the wear of the tool, thus holding the part dimensions within the desired size or tolerance limits or adjust the cutting tool to a different bore size.

The purpose of the following described assembly is to provide a compact rotating unit capable of providing both the retract and compensating motions as described in the foregoing. The compensating and retracting motions are accomplished during spindle rotation at normal operating speeds. This retracting and compensating unit will also operate when the spindle rotation is stopped. It is intended for any application requiring controlled linear and rotational motion of any practical length and/or specific rotary movement within one full revolution such as the device noted in Griswold et al. Pat. No. 3,391,585.

Referring to FIG. 1, the actuator assembly comprising a rotating section 11, and a coupling section 51, is mounted to the pulley 13 of a precision boring spindle as described in the above mentioned patent.

The rotating section 11 comprises a rotary actuator assembly 15, a cylinder assembly 31, and a manifold 41. The rotary actuator assembly 15 includes a housing 21 with a flange 23 on one end to serve as a means for mounting the complete assembly to pulley 13. The complete assembly must be in coaxial alignment with the spindle for reasons to be explained herein below. An extended shaft 25 is mounted for rotary movement only within the housing 21, abutting the inner bore surface 24 of flange 23. The shaft 25 is adopted for transmitting an indexing type of rotary motion to the compensating draw bar 27. (This is element 65 in Pat. No. 3,391,585 to Griswold et al., and assigned to the present assignee of record.) An unidirectional overrunning clutch 29 assures an accurate rotational positioning of the draw bar 27, but will not return or back-up on the return motion of the rotary actuator. Consequently, the cutting tool means is being held in the compensated position (see cutting tool means 38 in the above mentioned patent). A special feature of the overrunning clutch is its capability of permitting a linear motion of the draw bar 27 without using keys, splines, etc.

The cylinder assembly 31 consists of an internal bore 32 with an abutting flange 33 thereon. Piston 35 includes an annular recess 36 with a seal 17 inserted therein. The piston is adapted for advance and retraction movement to the draw bar 27, for reasons explained in the above mentioned patent. The piston is connected to a shaft 37 and is slidably movable within the bore 26 of shaft 25. Shaft 37 further includes a central fluid passageway 38 interconnecting with two radial passageways 39, for reasons to be explained hereinbelow.

Manifold 41 contains annular recess 40, fluid passages 42 and 43 interconnecting with fluid passage 44 in cylinder assembly 31, which further interconnects with fluid passage 45 in housing 21. The function of these fluid passages is to provide flow of fluid into chamber 46 on one side of vanes 47 in rotary actuator 15.

The annular passage 40 is connected to a fluid passage 48 in shaft 49. Shaft 49 forms an integral part of the manifold 41 by means of a press fit tolerance with recess 50 of manifold 41.

The movable or rotating parts of this assembly by pulley 13, are rotary actuator housing 21, cylinder assembly 31, manifold 41 and shaft 49.

The coupling portion of this device is the rotary union or coupling 51, which rotates around shaft 49. The coupling 51 consists of two ports 53 and 55. Port 53 connects with axially extending fluid bore passage 54. Port 55 connects with recess 56 in coupling 51.

IN OPERATION

Valve 61, in FIG. 3, is a three position directional valve, which can be shifted in either of positions A or C, with position B being in neutral.

When the directional valve 61 is in position B, as shown, both fluid passages 53 and 55 are connected to the drain or reservoir 58. Both actuators, namely piston 35 and actuator vanes 47 are in their normal retract position, as shown in FIG. 1 and FIG. 2, respectively, and consequently the tool cutter, not shown, is in its normal working position.

RETRACT

Energization of left solenoid in valve 61, shifts the spool to position A, causing fluid under pressure of the pump to flow through line 62 to part 53, as shown in FIG. 3. As viewed in FIG. 1, and FIG. 3, the fluid enters fluid passage 54 and against the face of piston 35 causing movement of piston 35 toward the right, as viewed in FIG. 1. Movement of piston 35 toward the right moves shaft 37 against draw bar 27 thereby resulting in retraction of the tool cutter radially, in a manner disclosed in the patent cited above. The tool cutter will be kept in this retract position until it has been removed from the bore of a workpiece. Coincidentally the fluid also flows through passage 38 and radial passages 39 onto the back face of vanes 47. Vanes 47 are resting against the fixed stop 59, therefore no rotational motion of the draw bar 27 can occur.

De-energization of the left side of the solenoid in valve 61, the spool will be spring centered to position B equalizing the pressures in lines 62 and 63; and the piston 35 will return to the normal piston retract position by means of spring 65 acting against draw bar 27 which in turn pushes against shaft 37 against piston 35 against the abutment 67 of manifold 41.

The fluid held in recess 69 is moved by action of piston moving to the right, as viewed in FIG. 1, to flow through transverse passage 34, through passages 44, 43, 42 into and through recess 40, into and through passage 48, into and through recess 56 and out through port 55 to reservoir 58.

COMPENSATION

Energization of the right side of valve 61 causes the spool to shift to position C, and fluid under pressure will be supplied to port 55, thence through recess 56 and passage 48, recess 40, passages 42, 43, 44, 45, into chamber of rotary actuator and front face of vanes 47. Fluid will flow through passage 34 into chamber 69 thereby holding piston 35 against the abutment 67, therefore no linear motion can occur, but the vanes 47 will be rotated through an angle alpha ($\alpha$) until it reaches stop 60. Rotation of the vanes 47 is adapted to transmit rotation to compensating bar 27 through shaft 25 and unidirectional overrunning clutch 29. Thus during each indexing cycle the draw bar is compensated through a fixed constant angle of rotation as determined by the angle alpha ($\alpha$). This rotation is then transmitted in a radial motion of the cutting tool as required to compensate for the wear of the cutting tool, or to adjust for different sizes, as disclosed in the above mentioned patent.

The fluid that was present in chamber 68 is moved by vanes 47 through passages 39, 38, 54 and out through port 53 to the reservoir.

When the valve 61 is de-energized, the spool will be spring centered and be shifted to position B; thereby causing ports 53 and 55 to be connected directly to the reservoir. Spring 70 causes return of the rotary actuator vanes 47 to its normal rest position, that is, against fixed stop 59.

It is apparent that the unidirectional overrunning clutch 29 prevents the compensating bar 27 from turning backward. It is adapted to be partially rotated in one direction only.

It is also apparent that to direct vane 47 against stop 59 can be effected by switching valve 61 from position C to position A thus aiding spring 70 through hydraulic pressure.

The foregoing cycle can be performed either manually or automatically generated command signals. It is further understood that the action described above can be reversed to accomplish the same action with a corresponding reversal of the actuating cams and direction of overrunning clutch.

What is claimed is:
1. An actuator assembly, adapted to retract or compensate a cutting tool on a precision boring spindle in only one direction during spindle rotation, comprising:
   (A) a coupling section, said coupling section comprising:
      (1) passages for flowing pressurized fluid therethrough;
      (2) a recessed bore for receiving one end of a rotatable shaft;
      (3) a rotatable shaft connected at one end to said coupling section, said rotatable shaft having passages for flowing pressurized fluid therethrough; and
   (B) a rotating section, said rotating section comprising:
      (1) a manifold, said manifold having a bore for receiving the other end of said rotatable shaft, said manifold also having passages for flowing pressurized fluid therethrough;
      (2) a rotary actuator assembly, said rotary actuator assembly comprising:
         (a) a housing, said housing having means for mounting the complete assembly, said housing also having passages for flowing pressurized fluid therethrough;
         (b) vane means connected to a rotary draw bar shaft, said vane means comprising stop means to limit the movement of said vane means and spring return means to return said vane means to its normal rest position;
         (c) said rotary draw bar shaft having a bore;
         (d) a draw bar mounted within said bore of said rotary draw bar shaft, said draw bar having spring return means;
         (e) unidirectional clutch means mounted in said bore of said rotary draw bar shaft and engaging said draw bar; and
      (3) a cylinder assembly between said manifold and said rotary actuator, said cylinder assembly having a bore, and further comprising:
         (a) linear actuator means located within said bore of said cylinder assembly, said linear actuator comprising a piston connected to a piston shaft, said piston shaft having a central passageway interconnecting with two radial passageways for flowing pressurized fluid therethrough, said piston shaft being slidably movable within said bore of said draw bar shaft;

whereby, said passages in said coupling section, said rotatable shaft, said manifold, said housing, and said piston shaft are mated such that fluid pressure may be directed to said vane means to cause partial movement of said vane means and effect rotatable compensation of said draw bar, and to said piston to cause linear movement of said piston and effect linear movement of said draw bar.

References Cited
UNITED STATES PATENTS

| | | | |
|---|---|---|---|
| 817,042 | 4/1906 | Burns | 408—178 |
| 1,233,683 | 7/1917 | Mertes | 408—178 |
| 2,263,085 | 11/1941 | Guild | 408—178 X |
| 3,499,352 | 3/1970 | Milewski et al. | 408—173 |
| 3,391,585 | 7/1968 | Griswold et al. | 77—4 |

MARTIN P. SCHWADRON, Primary Examiner

B. GROSSMAN, Assistant Examiner

U.S. Cl. X.R.

408—173